Figure 1:
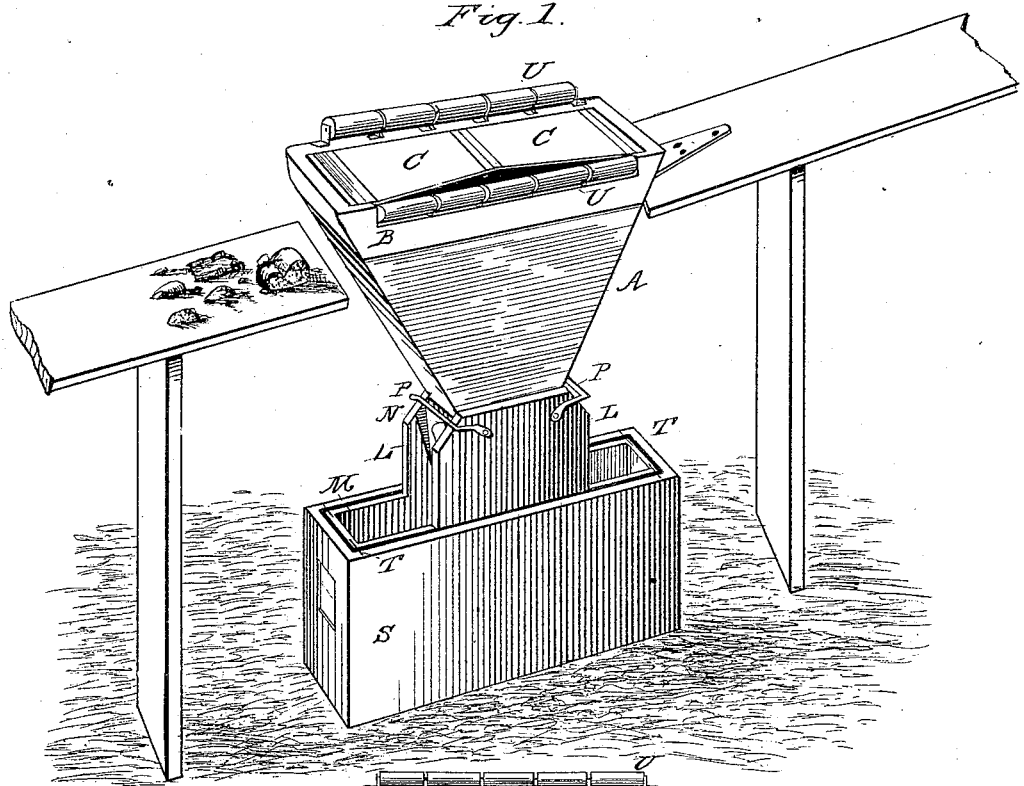

(No Model.)

G. B. WOOD.
ANIMAL TRAP.

No. 280,431. Patented July 3, 1883.

Witnesses
J. W. Reynolds Jr.
Eugene D'Ancui

Inventor
George B. Wood
per O. E. Duffy
Atty

N. PETERS, Photo-Lithographer, Washington, D. C.

(No Model.) 3 Sheets—Sheet 2.
G. B. WOOD.
ANIMAL TRAP.
No. 280,431. Patented July 3, 1883.
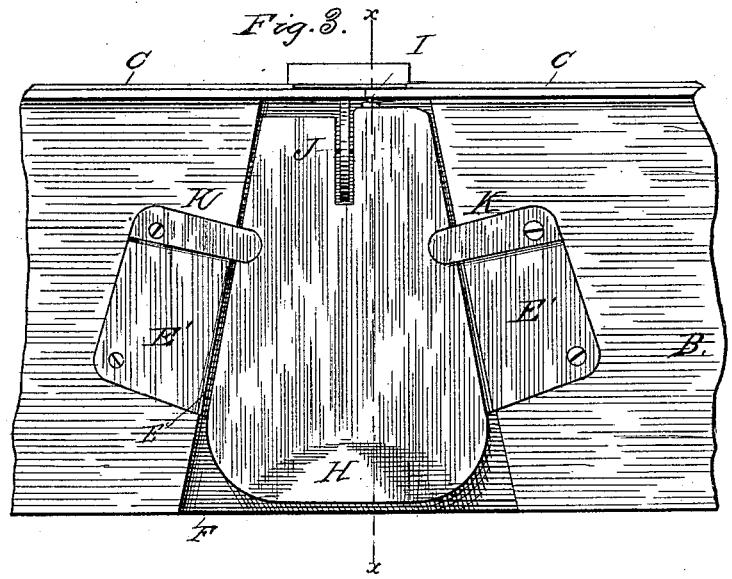
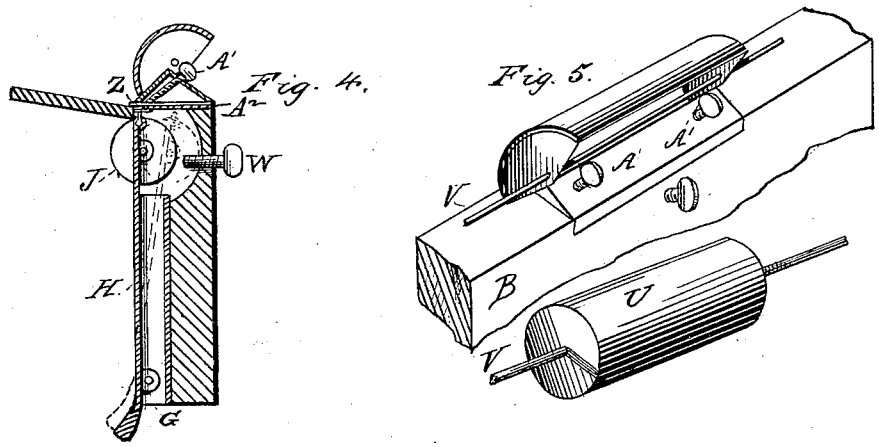
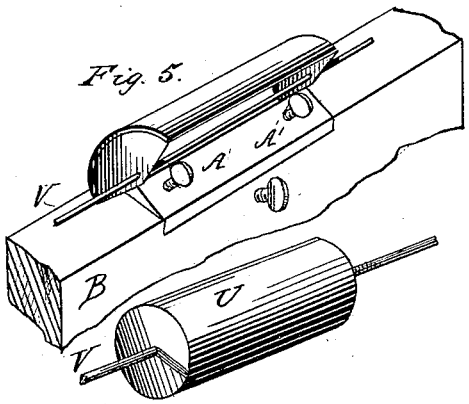
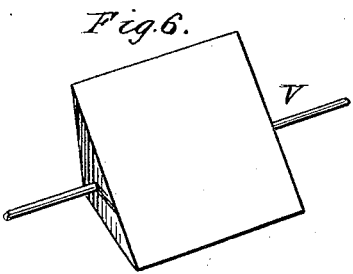
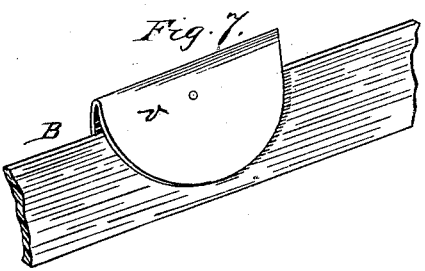
Witnesses
J. W. Reynolds Jr.
Eugene D. Carusi
Inventor
George B. Wood
per O. E. Duffy
Atty.

(No Model.) 3 Sheets—Sheet 3.

G. B. WOOD.
ANIMAL TRAP.

No. 280,431. Patented July 3, 1883.

Witnesses.
J. W. Reynolds Jr.
Eugene W Carew

Inventor
George B. Wood
per. O. E. Duffy
Atty.

UNITED STATES PATENT OFFICE.

GEORGE B. WOOD, OF CHICAGO, ILLINOIS.

ANIMAL-TRAP.

SPECIFICATION forming part of Letters Patent No. 280,431, dated July 3, 1883.

Application filed November 24, 1882. (No model.)

*To all whom it may concern:*

Be it known that I, GEORGE B. WOOD, of Chicago, in the county of Cook and State of Illinois, have invented certain new and useful Improvements in Animal-Traps; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has for its object to provide an improved trap for animals which will be automatically operated by the weight of the animal to spring the trap and precipitate the animal into a chamber containing a liquid, by means of which its destruction is insured, and which will automatically reset itself after trapping one or more animals, so as to be ready for the next, as more fully hereinafter specified.

My invention consists in peculiar and novel means for first assuring the animals to be trapped of entire safety by setting the trap in such solid or rigid manner that the tripping-boards will not yield by being passed over by said animals, and after this assurance is gained, by a slight change, the holding device is made the tripping device for the animal's destruction.

It further consists in applying to the sides of the trap revolving, tipping, or oscillating devices, whereby the animal is made to believe that retreat or getting over the sides of the trap is dangerous, and it therefore continues its course to be trapped; and it further consists in other details of construction, as will more fully hereinafter appear and be pointed out in the claims.

I have discovered that wary animals, and particularly rats, dislike passing between walls. Their object is, if possible, to travel over the surface unimpeded; and in order to provide for this natural instinct, I locate one series of my baffling devices on a plane above the trip-boards and the other side series on a plane with the trip-boards, or slightly below. In this way I make my improved trap in conformity with an animal's instinct and of its own nature.

These objects I attain by the means illustrated in the accompanying drawings, in which—

Figure 2:
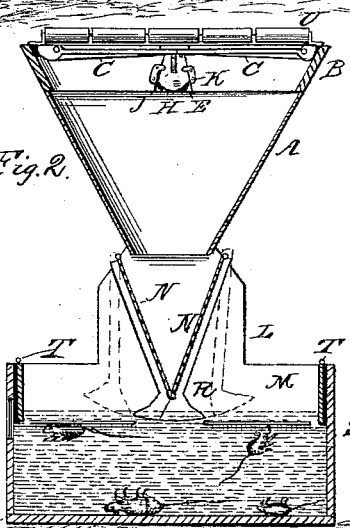
Figure 8:
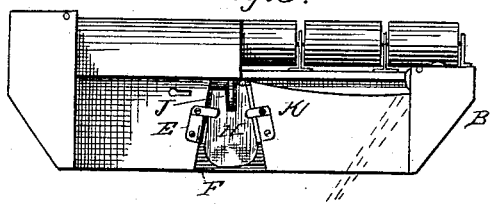
Figure 10:
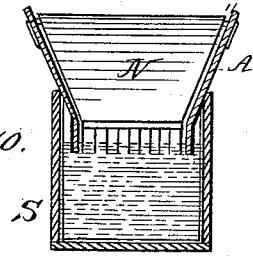
Figure 12:
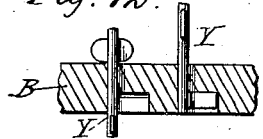
Figure 9:
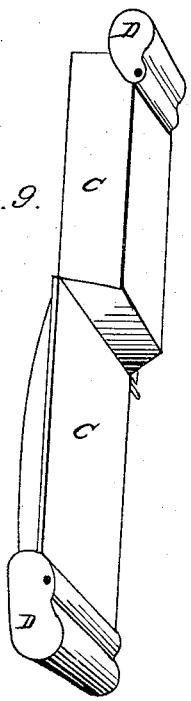
Figure 14:
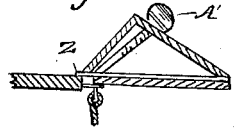
Figure 11:
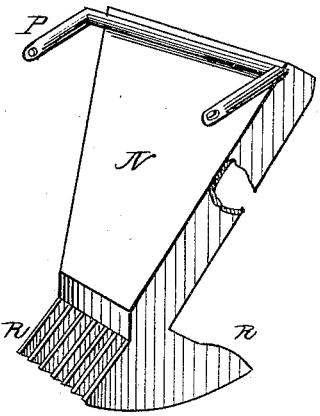
Figure 13:
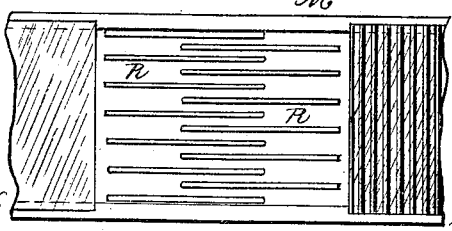

Figure 1 represents a perspective view of my improved trap, showing the same set and ready for operation; Fig. 2, a longitudinal vertical sectional view thereof; Fig. 3, a detached view, showing an elevation of the tripping devices in detail; Fig. 4, a vertical section on the line $x$ $x$ of Fig. 3, showing the tripping devices; Fig. 5, a detached perspective view of a portion of one of the upper edges of the trap, showing the means by which the animal is induced to remain on the trip boards or platforms of the trap, and an enlarged view of one of the rollers; Figs. 6 and 7, perspective views of such confining devices; Fig. 8, a view partly in section and partly in elevation, showing another form of the trip boards or platforms whereby the animal assumes an upright position, thus concentrating its weight at the proper point to trip the trap, and also the tripping mechanism and confining devices, the dotted lines illustrating the position of one of the trip-boards when tilted; Fig. 9, a perspective view detached of another form of the trip boards or platforms; Fig. 10, a transverse vertical section of a portion of the trap, showing a portion of the devices for confining the animal in the chamber containing the liquid into which it is precipitated; Fig. 11, a detached perspective view of a portion of such confining device; Fig. 12, a detached view of a portion of the trap, showing certain devices by means of which the trip boards or platforms may be locked when desired; and Fig. 13, a view of a portion of the trap, showing the lower parts or faces of the devices for confining the animal in the liquid-chamber. Fig. 14 is an enlarged detail view of the packing and adjusting devices.

I desire to further establish the fact that animals, and particularly rats, for which my improved trap is principally designed, will not enter a trap in which the parts show any tendency to give way or move upon their entrance; and I take advantage of this in the construction of my trap, first, to induce the animal to advance to a point from which retreat is impossible, at which time the trap will be invariably and surely tripped; and, second, to cause the animal to pass over the trip boards or platforms in a direct line from one end to the proper point for tripping, as more fully hereinafter specified.

In the drawings, letter A indicates an inverted pyramidal frustum, of sheet metal or other material, which forms a hollow hopper-shaped passage, and which is surmounted by a rectangular frame, B, of wood or other suitable material. The said frame has pivoted at its top, near each end, the trip boards or platforms C, each of which is weighted at the outer end, as indicated by the letter D, Fig. 9, so as to slightly overbalance the inner ends and tend to hold and return the boards normally in a horizontal position. The inner ends of the boards, when in such normal position, adjoin and form a continuous platform at the top of the trap. In order to hold the trip-boards firmly until the animal has advanced to the proper points and prevent frightening it by the tipping of said platform before such point is reached, and while the animal has still a chance to retreat, the devices shown in detail in Fig. 3 are employed. These consist of a metallic frame, E, having wings E', secured in a recess, F, at one side of the upper frame, B, of the trap, on the inside. Within said frame E, near its lower edge, is pivoted, by means of a wire, G, or otherwise, a metallic plate, H, the lower edge of which is weighted and sets out of line from the pivotal points, as indicated in Fig. 4, so as to cause the upper end of the plate to tip toward the trip boards or platforms by its own gravity, thus automatically setting it. The trip board or platform, at the entrance side of the trap, near its inner end, on the side adjacent said pivoted plate, is provided with a lug or projection, I, which, when the parts are normal in position, sets over the top of said plate, which holds the said trip board or platform firmly in a horizontal position. The plate is slotted, as indicated, near the top, and is provided with a small disk or wheel, J, the periphery of which sets under the end of the other trip-board, at one side of the same, in such manner that when the animal passes the first-mentioned trip-board onto the second its weight will cause the last-mentioned trip-board to tilt, pushing the upper end of the plate back, releasing the fixed board, causing both plates to tilt, and then precipitate the animal below. The inward movement of the plate is properly limited by means of lugs K, secured to the frame. The lower end of the pyramidal frustum before mentioned sets between two upright walls, L, extending upward from the sides of a rectangular frame, M; and within said walls, and extending down into the said frame nearly to the bottom thereof, are located two swinging frames, N. These frames are provided with arms P at their upper ends, which are pivoted to the upper portions of the walls, as indicated in Fig. 1 of the drawings. These arms are so located with respect to the frames that the frames, in seeking their center of gravity, will swing together at their lower ends in the absence of any weight between them, causing said ends to meet, as shown in Fig. 2. The said frames are each provided with a series of blades, R, so arranged as to intermesh with each other alternately when the said ends are together and prevent the separation of the frames from below by any effort of the animal in attempting to escape upward, while they permit the plates to readily separate by the weight of the animal when dropped between, so as to precipitate the animal into the chamber below. These blades cut through the water freely, permitting the swinging frame to approach and recede rapidly and easily, and insure the destruction of the animal. The fluid in the tank or fluid-chamber is always to be kept above the level of the glass bottom of the lower frame. The bottom of the frame M is constructed of glass, wire, or similar open-work, with a central opening directly below the swinging arms above mentioned, the said opening being closed by the blades at the lower ends of the swinging frames when the same are together, so as to prevent the escape of the animal upward, as before mentioned. The frame M sets in the upper part of a tank or liquid-chamber, S, and is held removably in place by means of bolts T, and the said tank or chamber, when the trap is in use, is charged with liquid, preferably of a preservative nature—such as salt water or other like solution—the object of which is to "pickle" the animal or animals as they are caught and prevent any offensive odor arising from decomposition. In order to induce the animals to cross the platforms in a direct line from the entrance to the point where the bait is located, as indicated in Fig. 1, the upper frame, at its sides, is provided with a series of rollers, U, mounted on shafts V, supported on uprights attached to the frame, or in longitudinal recesses at the edge of the said upper frame, or secured in any other convenient manner. Instead of the rollers, as above mentioned, "tumblers," such as shown in Figs. 6 and 7, may be employed, which will tilt back and forth by the weight of the animal and frighten it off when attempting to enter the trap from one side, or drop it back when attempting to escape toward either side when once on the platform. Fig. 6 shows a triangular block arranged to tilt on the shaft V, while Fig. 7 shows a saddle-shaped plate arranged to tilt on a pivot which is at right angles to the frame. These tumblers may be of the shape shown in the drawings or of any other convenient shape.

In the form of my invention shown by Figs. 8 and 9 the platforms are shown as located on different horizontal planes, so as to form a step from one to the other at the point of juncture, in order to compel the animal to raise itself on the tripping-board in its search for the bait, and thus concentrate the weight at the tripping-point, so as to insure the tripping of the platforms. In some instances, when the animals are peculiarly wary, it may be desirable, in order to gain their confidence, when the trap is first set, to permit them to travel freely over the platforms until they become familiar with the trap, and for this purpose locking devices such as indicated in Figs. 4 and 12 are employed. As shown in Fig. 4 of the drawings, the said device consists simply of a set-screw, W, which may be brought to bear against the trip-plate, so as to prevent it from being shifted, and thus retain the platforms rigidly until the proper time. As shown in Fig. 12, the locking device consists of feathered shaft Y, passing through the sides of the upper frame and adapted to be forced inward, so as to engage the trip boards or platforms and prevent their tilting. Two shafts Y are used, one under each of the tilting platforms.

In order to keep the platforms tight against their seats, to prevent noise as the parts may become worn from use or otherwise become loosened, a packing of felt, Z, is provided, which can be adjusted to compensate for such wear or looseness by means of set-screws A', as shown in Figs. 4 and 5 of the drawings. The packing is fastened by any suitable means to the under side of the top plate, $A^2$, of the frame, and projects inwardly beyond the edge of said plate, as shown enlarged by Fig. 14.

The operation of my invention will be readily understood from the above description. The trap, as shown in Fig. 1, is set between two shelves, being hinged to one of the shelves at the entrance end and held by any suitable means. The entire trap is so located that an animal can only reach the bait by passing over the trap, such location being obvious to the persons setting the trap. The animal in passing upon the first platform, feeling it to be secure, proceeds without fear until it reaches the second, when it will have advanced beyond the possibility of retreat. Upon stepping upon the second its weight trips the tripping devices, as before mentioned, precipitating it between the swinging frames, separating the same, and permitting the animal to drop into the tank below. The animal, while alive, will naturally seek the lighted surface, but will find its way barred by the glass or barred bottom of the lower frame and the blades of the swinging frames, and when life is extinct will settle to the bottom, thus permitting the trap to remain in operation until the trap is full, the preservative liquid preventing any decomposition, and consequent disagreeable odors, and when the trap is filled the dead animals may be removed.

The liquid-chamber, at one side, is provided with a suitable overflow-aperture, through which surplus liquid escapes when charging, and through which the displaced liquid may escape as the animals are deposited from time to time, and at either or both ends, or other convenient parts, with a glass or transparent window, through which the light enters for the attraction of the rat from the entrance.

It will be seen that as the water-line is always above the bottom of the frame the animal is at once completely submerged as soon as dropped into the fluid chamber or tank, and can never rise to the surface, and therefore almost instantly killed, as it has no chance to breathe.

Having thus described my invention, what I claim and desire to secure is—

1. In an animal-trap, the combination, with a suitable frame, of two weighted trip-boards, pivoted therein near their ends, so as to maintain normally a horizontal position, with a tilting plate located in a recess at one side of the frame, one of said boards being provided with a projection adapted to be held by the plate to support said board, the plate being provided with a disk, against which the other board is adapted to fall to release the first-mentioned board, substantially as and for the purposes specified.

2. In combination with the frame and trip-boards, the rollers or tumblers located at the upper edges of the sides of the frame, whereby the animals are induced to travel across the boards in a direct line, substantially as and for the purposes specified.

3. The combination, with the rectangular frame, of the weighted pivoted trip-boards arranged in different horizontal planes, whereby the animal is compelled to raise itself on the tripping-board in passing from one to the other, and thus concentrate its weight at the proper point to trip the boards, substantially as and for the purposes specified.

4. The combination, with the frame, the trip-boards, and tripping devices, of the inverted pyramidal frustum, the lower frame and its vertical side walls, and the swinging frames pivoted thereto, and provided with intermeshing knife-blades adapted to close an opening in the bottom of the lower frame, through which the animals are dropped into a tank below, substantially as specified.

5. The combination, with the lower frame and the swinging frames, having knife-blades at their lower ends, the transparent or slotted bottom section adapted to be submerged below the level of the liquid in a suitable tank, substantially as and for the purpose specified.

6. The combination, in an animal-trap, of the upper frame, the trip-boards and tripping devices, the pyramidal frustum, the lower frame and its swinging frames, provided with intermeshing knife-blades at their lower ends, and having a transparent or slotted bottom with a central opening, and the liquid-tank, all arranged to operate substantially as and for the purposes specified.

7. The combination of the swinging tripping device with an adjustable stop for locking said device, whereby the platform may be secured in a horizontal position, substantially as and for the purposes set forth.

8. The combination, with the upper frame and the trip-boards, of a packing of felt or other suitable material, and adjusting devices for adjusting the packing when worn, and also forming an adjustable seat for the inner ends of the trip-boards, substantially as and for the purposes specified.

In testimony that I claim the foregoing as my own invention I affix my signature in presence of two witnesses.

GEO. B. WOOD.

Witnesses:
B. F. MORSELL,
O. E. DUFFY.